2,965,450
PRODUCTION OF DIBORANE

Claude J. Barr, East Alton, Ill., and Donald G. Hummel, Manhattan, Kans., assignors to Olin Mathieson Chemical Corporation, a corporation of Virginia No Drawing. Filed Sept. 6, 1957, Ser. No. 682,557

18 Claims. (Cl. 23—204)

This invention relates to the preparation of boron hydrides and more particularly to the production of diborane by the hydrogenation of a compound of boron. Diborane is a well-known compound of boron having utility as a welding fuel (Nerad's U.S. Patent 2,582,268) and in the formation of other boron containing compounds.

There are many chemical processes for producing diborane. However, diborane is difficult and expensive to produce in quantities because of its instability, extreme reactivity and rapid hydrolysis. Many of the present methods of production utilize costly reactants. The object of this invention is to produce diborane by a simple direct hydrogenation of a boron-containing compound.

According to the practice of this invention, diborane is produced by reacting hydrogen gas with a boron trimer having the formula:

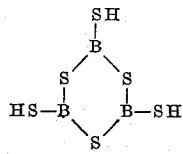

in the presence of a hydrogenation catalyst such as Raney nickel. The equation representative of the reaction is as follows:

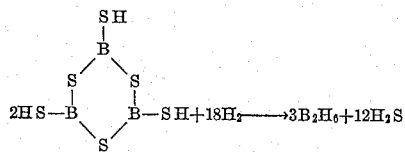

The invention is further described with reference to the following illustrative example.

Example

The apparatus of this experiment was arranged so that hydrogen gas from a tank flowed through glass tubing into a reaction flask, thence through a reflux condenser into an ice-cooled trap and then through a scrubber containing dimethylaniline. The reaction flask was a 200 ml. three-necked glass flask equipped with a motor-driven stirring paddle inserted through the center neck, an inlet tube extending below the surface of the reactants and an outlet leading to a reflux condenser having a cold finger (cooled by circulating tap water) extending therein. The cold trap consisted of a Pyrex glass U-tube (1 inch diameter) immersed in ice water and was connected to the bottom of a 50 ml. vertical scrubbing tube containing 10 ml. of dimethylaniline for absorbing diborane. When in operation, the reaction flask was positioned on an electrical resistance heating element, having a variable current supply.

Previous to performing the experiment, the apparatus was cleaned thoroughly, oven-dried and assembled. The three-necked reaction flask was then charged with 150 ml. of xylene, 3 grams of the boron trimer ($B_3S_6H_3$) and 2.5 grams of finely divided wax-coated Raney nickel catalyst, which had been thoroughly washed in xylene several times to remove the wax coating in which it was preserved. The reaction flask was then positioned in the apparatus, the stirring paddle rotated (about 350 r.p.m.) and the hydrogen tank adjusted so that the flow of hydrogen was approximately 4 cc. per minute. Hydrogen was allowed to flow through the apparatus for several minutes to flush out any air, and then the electrical heating element under the reaction flask was turned on and adjusted to 30 volts. This heating was allowed to continue for one hour and the voltage increased to 50 volts for a second hour. At this time the temperature within the flask was measured and found to be 135° C. The heating paddle and hydrogen flow were then stopped and the apparatus allowed to cool to room temperature, left for forty hours, and then the dimethylaniline solution in the scrubber was removed and analyzed. Infrared analysis indicated a dimethylaniline:diborane adduct. Wet analysis showed that the dimethylaniline contained 0.0133 g. of boron, the equivalent of 0.0169 g. of diborane or an 11 percent yield. Other means, such as fractionation condensation, can be used to separate the diborane from the reaction products.

The trimer $B_3S_6H_3$ can be prepared by reacting boron tribromide with hydrogen sulfide at about 50° C. in the presence of a solvent such as carbon disulfide as is illustrated by the equation:

$$3BBr_3 + 6H_2S \rightarrow B_3S_6H_3 + 9HBr$$

For further information concerning the preparation of the trimer, reference is made to the article by Wiberg and Sturm, Angew. Chem., 67, 483–493 (1955).

In carrying out the reaction, the amount of hydrogen is in excess. The flow of this gas serves both as a reactant and as a vehicle for transporting the diborane and other products through the system. Raney nickel proved to be the most successful catalyst. However, other hydrogenation catalysts can be employed, such as nickel supported on alumina, palladium black or platinum black, carbon-supported palladium or platinum, cobalt molybdenum, molybdenum sulfides, and nickel bromide. The reaction temperature is between 25° to 200° C. and the reaction pressure can vary from 1 to 5 atmospheres or more. The reaction will proceed with or without a solvent. The solvent, when used, can be any of a variety which are poor solvents for diborane and which are inert under the reaction conditions. Benzene, toluene, xylene and mineral oil are satisfactory. The amount of trimer dissolved in the solvent, when one is used, is preferably from about 0.5 to 10 percent by weight, based upon the total weight of the solution.

We claim:

1. A method for the production of diborane which comprises passing a stream of hydrogen gas into a mixture of

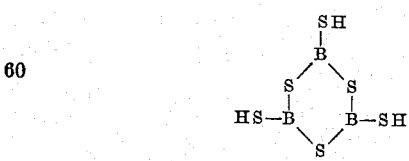

and a hydrogen catalyst maintained at a temperature of from 25° C. to 200° C. whereby the hydrogen and

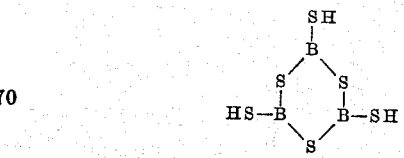

react to produce diborane, removing an exit gas stream including hydrogen gas and diborane from the reaction zone, and recovering diborane from the exit stream.

2. The method of claim 1 wherein the hydrogenation catalyst is nickel.

3. The method of claim 1 wherein the hydrogenation catalyst is nickel supported on alumina.

4. The method of claim 1 wherein the hydrogenation catalyst is palladium black.

5. The method of claim 1 wherein the hydrogenation catalyst is platinum black.

6. The method of claim 1 wherein the hydrogenation catalyst is palladium supported on carbon.

7. The method of claim 1 wherein the hydrogenation catalyst is a cobalt molybdenum catalyst.

8. The method of claim 1 wherein the hydrogenation catalyst is molybdenum sulfides.

9. A method for the production of diborane which comprises passing a stream of hydrogen gas into a mixture of a hydrogenation catalyst and a solution containing from 0.5 to 10 percent by weight of

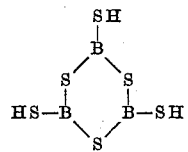

dissolved in a solvent which is a poor solvent for diborane and which is inert under the reaction conditions maintained at a temperature of from 25° C. to 200° C. whereby the hydrogen and

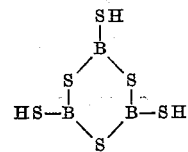

react to produce diborane, removing an exit stream including hydrogen gas and diborane from the reaction zone, and recovering diborane from the exit gas stream.

10. The method of claim 9 wherein the solvent is xylene.

11. The method of claim 9 wherein the solvent is toluene.

12. The method of claim 9 wherein the solvent is high boiling petroleum distillate.

13. The method of claim 9 in which the catalyst is nickel supported on alumina.

14. The method of claim 9 in which the catalyst is palladium black.

15. The method of claim 9 in which the catalyst is platinum black.

16. The method of claim 9 in which the catalyst is palladium on carbon.

17. The method of claim 9 in which the catalyst is cobalt molybdenum catalyst.

18. The method of claim 9 in which the catalyst is molybdenum sulfides.

No references cited.